(12) United States Patent
Kitamura

(10) Patent No.: US 7,424,162 B2
(45) Date of Patent: Sep. 9, 2008

(54) IMAGE COMPRESSION SYSTEM WITH CODING QUANTITY CONTROL

(75) Inventor: Takuya Kitamura, Tokyo (JP)

(73) Assignee: Sony Corporation, Tokyo (JP)

( * ) Notice: Subject to any disclaimer, the term of this patent is extended or adjusted under 35 U.S.C. 154(b) by 741 days.

(21) Appl. No.: 10/509,203

(22) PCT Filed: Mar. 14, 2003

(86) PCT No.: PCT/JP03/03109

§ 371 (c)(1),
(2), (4) Date: Sep. 24, 2004

(87) PCT Pub. No.: WO03/084243

PCT Pub. Date: Oct. 9, 2003

(65) Prior Publication Data

US 2005/0147308 A1    Jul. 7, 2005

(30) Foreign Application Priority Data

Mar. 28, 2002    (JP)    ............................. 2002-092884

(51) Int. Cl.
G06K 9/36    (2006.01)
(52) U.S. Cl. .................................................... 382/239
(58) Field of Classification Search ................ 382/239; 341/51; 348/404.1–407.1, 419.1; 358/426.02–426.11
See application file for complete search history.

(56) References Cited

U.S. PATENT DOCUMENTS

| | | | | |
|---|---|---|---|---|
| 5,903,669 | A * | 5/1999 | Hirabayashi | ................ 382/232 |
| 6,028,896 | A * | 2/2000 | Jang et al. | .............. 375/240.04 |
| 6,075,897 | A * | 6/2000 | Kosugi | ........................ 382/232 |
| 2003/0053115 | A1* | 3/2003 | Shoda et al. | ................ 358/1.15 |

FOREIGN PATENT DOCUMENTS

| | | |
|---|---|---|
| JP | 4-156794 | 5/1992 |
| JP | 4 156794 | 5/1992 |
| JP | 4-233373 | 8/1992 |

(Continued)

OTHER PUBLICATIONS

Stone et al., "Data encoding apparatus with multiple encoders", WO 02/07447 A1, Jan. 24, 2002.*

Primary Examiner—Vikkram Bali
Assistant Examiner—Eueng-Nan Yeh
(74) Attorney, Agent, or Firm—Frommer Lawrence & Haug LLP; William S. Frommer

(57) ABSTRACT

An apparatus and method to preferentially select code quantity from DPCM path in a manner to satisfy the target code quantity thereby preventing deterioration of image quality. Code quantities obtained by a first compression system of quantizing an input image signal by quantization steps different from each other, or code quantities obtained by a second compression system which has compression factor and loss which are lower than those of the first compression system are added on an encoding system selection basis to calculate a total code quantity of an equi-length unit. A calculated total code quantity and a target code quantity in the equi-length unit are compared to determine quantization step in the first compression system in accordance with the comparison result to select, on the encoding system selection basis, the first compression system or the second compression system of performing quantization by the determined quantization step.

4 Claims, 10 Drawing Sheets

FOREIGN PATENT DOCUMENTS

| | | |
|---|---|---|
| JP | 4 233373 | 8/1992 |
| JP | 5-207287 | 8/1993 |
| JP | 6-54208 | 2/1994 |
| JP | 6-332667 | 12/1994 |
| JP | 10 75370 | 3/1998 |
| JP | 10-75370 | 3/1998 |
| WO | WO 96/28937 | 9/1996 |

* cited by examiner

IMAGE COMPRESSION SYSTEM WITH CODING QUANTITY CONTROL

TECHNICAL FIELD

The present invention relates to an image compression encoding apparatus and an image compression encoding method which are applied to, e.g., MPEG (Moving Picture image coding Experts Group), etc., and have ability to control generated information quantity by encoding operation using, e.g., DCT (Discrete Cosine Transform), or DPCM (Differential Pulse Code Modulation).

This Application claims priority of Japanese Patent Application No. 2002-092884, filed on Mar. 28, 2002, the entirety of which is incorporated by reference herein.

BACKGROUND ART

For example, in systems for performing transmission of moving picture (image) signals to remote place like television conference system and/or television telephone system, when moving picture signals are digitized as they are, information quantity extremely large. However, image signals are compression-encoded by making use of line correlation or inter-frame correlation of video signals to thereby have ability to decrease information quantity. As a result, transmission of many moving pictures (images) can be made at the same time, and moving pictures (images) of long line can be recorded with respect to a recording medium in its turn. As the representative system of efficient encoding system for moving picture (image), there is MPEG system. In the MPEG system, code quantity control is performed so that bit stream sent to a transmission path has a desired rate.

FIG. 1 shows the configuration of a conventional image compression encoding apparatus 7 represented by the MPEG system. This conventional image compression encoding apparatus 7 realizes irreversible image compression on the basis of the DCT encoding system of performing DCT of inputted image signal thereafter to quantize the image signal thus transformed. The image compression encoding apparatus 7 comprises a terminal 71, a block dividing unit 72, a DCT unit 73, a quantization unit 74, a variable length encoding unit 75, and a buffer 79.

In this FIG. 1, the terminal 71 is supplied with an image signal consisting of luminance signal Y, and color difference signals Pb, Pr.

The block dividing unit 72 serves to divide inputted image signal of one frame into, e.g., 8×8 blocks to output them to the DCT unit 73.

The DCT unit 73 implements DCT every 8×8 blocks to thereby generate DCT coefficients to output the DCT coefficients thus generated to the quantization unit 74. The quantization unit 74 quantizes DCT coefficients inputted from the DCT unit 73 by quantization step determined on block basis. The quantization unit 74 delivers the quantized data (hereinafter referred to as quantization level) to the variable length encoding unit 75. The variable length encoding unit 75 performs variable length encoding of the quantization level delivered from the quantization unit 74 by method, e.g., two-dimensional Huffman encoding or arithemetic encoding, etc.

In this respect, code quantity control at the image compression encoding apparatus 7 is performed by controlling quantization step. There are also instances where such code quantity control may be performed by conducting a feedback control by using, e.g., the remaining quantity of virtual buffer and the relationship between quantization step when encoding has been conducted in the past and generated code quantity.

It is to be noted that, in the image compression encoding apparatus 7, it is required to perform code quantity control so that total code quantity generated at one frame (equi-length unit) is not above set target code quantity at all times. However, when large code quantity is left as total code quantity in order to satisfy target code quantity, image quality would be rather deteriorated. For this reason, in the prior art, there is proposed a code quantity control method for using up total code quantity while satisfying target code quantity. In this code quantity control method, code quantity generated in equi-length unit is calculated in advance at plural quantization steps to determine suitable quantization step within the range where generated code quantity is not above target code quantity, and is proposed, as feed-forward system, in, e.g., International Laid Open Publication WO 96/28937.

In the conventional code quantity control method of the feed-forward system, etc., when the quantization step is enlarged, quantization becomes coarse so that total code quantity becomes small. On the other hand, when the quantization step is reduced, quantization becomes fine so that total code quantity also becomes large. Moreover, since only discrete values can be acquired at quantization, the total code quantity also becomes discrete. Namely, the quantization step is controlled on block basis, thereby making it possible to control total code quantity. In order to use up total code quantity while satisfying the target code quantity, it is necessary to select, every block, quantization step which is less than target code quantity and which is minimum.

However, in the above-described code quantity control method based on the DCT encoding system, when DCT coefficients are quantized by quantization step selected, e.g., on block basis, any distortion may be added in the process of compression and expansion of image, it is impossible to completely maintain original image quality. For this reason, it was necessary to employ the reversible encoding (Lossless) system which can preserve original information via processes of compression and expansion like, e.g., ideally DPCM while realizing such a code quantity control which is not above set target code quantity to thereby prevent deterioration of picture quality.

DISCLOSURE OF THE INVENTION

In view of conventional actual circumstances as described above, an object of the present invention is to provide an image compression encoding apparatus and an image compression encoding method which can efficiently select DCT encoding system or reversible encoding system every respective blocks while satisfying target code quantity.

In the present invention, code quantity from DCT path or DPCM path quantized by plural quantization steps can be selected efficiently and in a manner to satisfy target code quantity, and code quantity from DPCM path is preferentially selected to thereby prevent deterioration of image quality.

Namely, in order to solve the above-described problems, the image compression encoding apparatus according to the present invention is directed to an image compression encoding apparatus adapted for selecting, on encoding system selection basis, a first compression system or a second compression system having compression factor and loss which are lower than the first compression system to compression-encode an image signal, the image compression encoding apparatus comprises: calculating means for adding, on encoding system selection basis, code quantities obtained by the first compression system or code quantities obtained by the second compression system to thereby calculate total code quantity of the encoding system selection basis; selector means for selecting, on the encoding system selection basis, the first compression system or the second compression system on the basis of total code quantity calculated by the calculating means and target code quantity in equi-length unit; compression-encoding means for compression-encoding an image signal of the respective encoding system selection bases by using the compression system selected by the selector means.

Moreover, in order to solve the above-described problems, the image compression encoding method according to the present invention is directed to an image compression encoding method of selecting, on encoding system selection basis, a first compression system or a second compression system having compression factor and loss which are lower than those of the first compression system to compression encode an image signal, the image compression encoding method including: a calculation step of adding, on the encoding system selection basis, either code quantities obtained by the first compression system or code quantities obtained by the second compression system to thereby calculate total code quantity of the encoding system selection basis, a selection step of selecting, on the encoding system selection basis, the first compression system or the second compression system on the basis of total code quantity calculated at the calculation step and target code quantity in equi-length unit; and a compression-encoding step of compression-encoding an image signal of the respective encoding system selection bases by using the compression system selected at the selection step.

Further, in order to solve the above-described problems, the program according to the present invention is directed to a program for allowing computer to execute a processing to select, on encoding system selection basis, a first compression system or a second compression system having compression factor and loss which are lower than those of the first compression system to compression-encode an image signal, wherein the program allows computer to add, on the encoding system selection basis, either code quantities obtained by the first compression system or code quantities obtained by the second compression system to thereby calculate total code quantity of the encoding system selection basis to select, on the encoding selection basis, the first compression system or the second compression system on the basis of calculated total code quantity and target code quantity in the equi-length unit to compression-encode an image signal of the respective encoding system selection bases by using the selected compression system.

BEST MODE FOR CARRYING OUT THE INVENTION

Embodiments of the present invention will now be explained.

The image compression encoding apparatus according to this embodiment is adapted to perform, e.g., DCT (Discrete Cosine Transform) of an inputted image signal thereafter to quantize the image signals thus transformed to thereby realize irreversible image compression, or is adapted to realize reversible encoding on the basis of, e.g., DPCM (Differential Pulse Code Modulation), etc.

Figure 1:
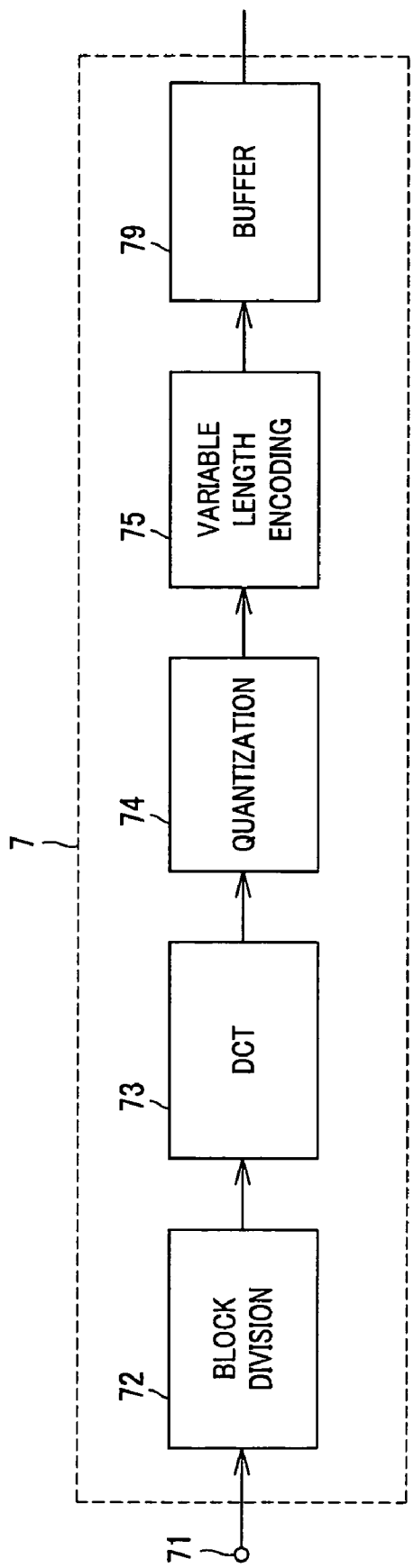
FIG. 1 is a view showing the configuration of a conventional image compression encoding apparatus utilizing the MPEG system.
Figure 2:
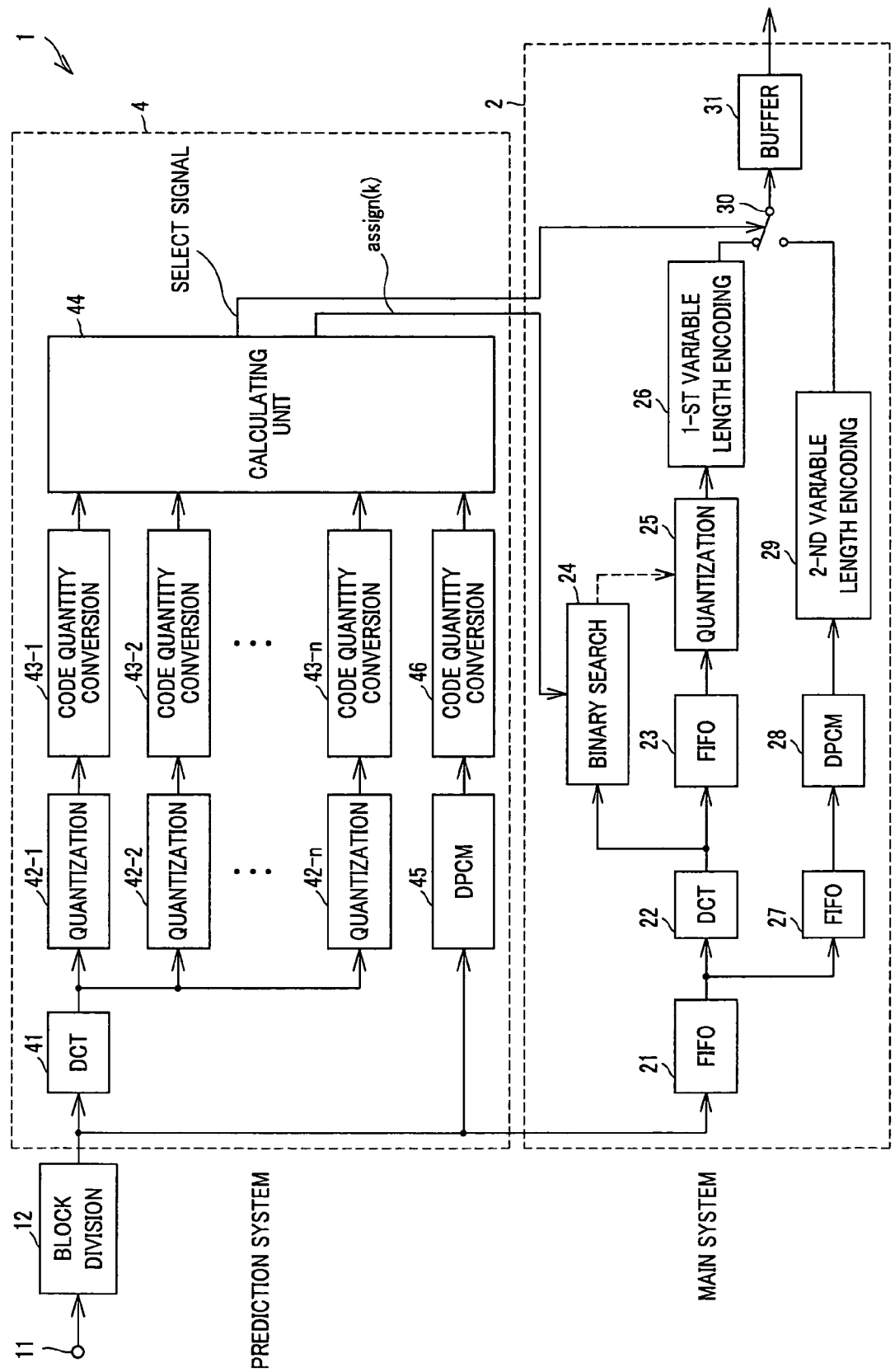
FIG. 2 is a view showing an internal configuration example of an image compression encoding apparatus to which the present invention is applied.

As shown in FIG. 2, the image compression encoding apparatus 1 is supplied with an image signal consisting of luminance signal Y and color difference signals Pb, Pr through a terminal 11. The block dividing unit 12 selects an inputted image signal of one frame on encoding system selection basis to transmit the image signal thus selected to a main system 2 and a prediction system 4. This encoding system selection unit (basis) indicates, e.g., block unit of 8×8, macro block unit of 16×16, slice unit, or division into image area consisting of plural pixels. Explanation will be given below in connection with the case where division is made by block unit of 8×8.

The main system 2 comprises a DCT path composed of a FIFO (First In First Out) memory 21, a DCT unit 22, a FIFO memory 23, a binary search unit 24, a quantization unit 25 and a first variable length encoding unit 26, a DPCM path composed of a FIFO memory 27, a DPCM unit 28 and a second variable length encoding unit 29, a selector 30, and a buffer 31.

First, the DCT path will be explained. Data delivered to the main system 2 is temporarily stored into the FIFO memory 21 in order to adjust interval until select signal and code quantity which will be described later are delivered from the prediction system 4. The data stored in the FIFO memory 21 is delivered to the DCT unit 22 and the FIFO memory 27.

The DCT unit 22 implements DCT every 8×8 blocks to thereby generate DCT coefficients to transmit them to the FIFO memory 23 and the binary search unit 24. The DCT coefficients temporarily stored in the FIFO memory 23 are outputted to the quantization unit 25. The quantization unit 25 quantizes the DCT coefficients inputted from the DCT unit 22 by quantization step determined by the binary search unit 24 on block basis. The quantization unit 25 delivers the quantized data (hereinafter referred to as quantization level) to the first variable length encoding unit 26. The first variable length encoding unit 26 performs variable length encoding of quantization level delivered from the quantization unit 25 by method, e.g., two-dimensional Huffman encoding or arithemetic encoding, etc. In this respect, in the image compression encoding apparatus 1 according to this embodiment, the configuration in which the first variable length encoding unit 26 is omitted may be applied.

Namely, since an image signal is passed through the DCT path to thereby have ability to encode image signal on the basis of quantization step delivered every respective blocks through the binary search unit 24, control can be made such that total code quantity of one frame is not above the target code quantity. It should be understood that the method using the binary search unit 24 is only one example, but other systems may be used.

Then, the DPCM path will be explained. The DPCM unit 28 is supplied with data stored in the FIFO memory 27 which plays a role of delay element in the above-described DCT path to implement DPCM every block to the data to deliver the data thus obtained to the second variable length encoding unit 29. The second variable length encoding unit 29 performs variable length encoding of the data to which the DPCM has been implemented by method, e.g., two-dimensional Huffman encoding or arithematic encoding, etc. It is to be noted that it is not required that the method for variable length encoding at the second variable length encoding unit 29 is similar to the method at the above-described first variable length encoding unit 26. In addition, at the image compression encoding apparatus 1 according to this embodiment, the configuration in which the second variable length encoding unit 29 is omitted may be applied.

The selector 30 suitably switches various data which have been caused to undergo variable length encoding by the first variable length encoding unit 26 or the second variable length encoding unit 29 to output the data thus obtained together with corresponding switching information. In this respect, the selector 30 is switched on the basis of select signal delivered from the prediction system 4.

Namely, data is passed through the DPCM path, whereby data can be reversibly encoded so as to have ability to completely maintain original image quality in the state where any distortion is added.

The prediction system 4 comprises a DCT path composed of a DCT unit 41, n quantizers 42-1 to 42-$n$ and n code quantity converters 43-1 to 43-$n$, a DPCM path composed of a DPCM unit 45 and a code quantity converter 46, and a calculating unit 44. The prediction system 44 is provided in order to calculate total code quantity generated in equi-length units so that the main system 2 can select suitable DCT path or DPCM path within the range which is not above the target code quantity. This equi-length unit means one frame in this embodiment, but is not limited to such a case, and may be, e.g., 8×8 blocks or 16×16 macro blocks, or slice unit in which they are combined. In addition, this equi-length unit may be any image area consisting of plural pixels, and may be GOP unit in which frames are combined.

First, the DCT path will be explained. The DCT path serves to realize irrevesible image compression on the basis of the DCT encoding system of performing DCT of, e.g., inputted image signal thereafter to quantize the image signal thus obtained, and has high compression factor and has large loss as compared to the DPCM path. Moreover, transform encoding in the DCT path is not limited to DCT, but other transform encoding system may be used. Further, in the DCT path, transform encoding is performed in units of 8×8 blocks. However, the present invention is not limited to such case, but transform encoding may be performed in the above-described macro block unit, or may be performed with image area consisting of plural pixels being as one unit.

Similarly to the DCT unit 22, the DCT unit 41 implements DCT every 8.times.8 blocks to thereby generate DCT coefficients to transmit them to respective quantizers 42-1 to 42-$n$. The quantizers 42-1 to 42-$n$quantize DCT coefficients delivered from the DCT unit 41 by quantization steps different from each other. Thus, it becomes possible to try the generated DCT coefficients by n quantization steps. Moreover, the respective quantizers 42-1 to 42-$n$ respectively deliver the generated quantization levels to code quantity converters 43-1 to 43-$n$. The code quantity converters 43-1 to 43-$n$ respectively convert the delivered quantization levels into code quantities every blocks to transmit them to the calculating unit 44. Namely, in conversion of code quantity at the code quantity converters 43-1 to 43-$n$, variable length encoding of quantization levels generated by the quantities 42-1 to 42-$n$ may be performed to output the code length.

Then, the DPCM path will be explained. The DPCM path serves to realize reversible image compression on the basis of reversible encoding (Lossless) system which can preserve original information via processes of compression and expansion like, e.g., DPCM, and has low compression factor and has small loss as compared to the DCT path. Moreover, in the DPCM path, transform encoding is performed every units of 8×8 blocks. However, the present invention is not limited to such a case, but may be performed in units of the above-described macro blocks, or may be performed with image area consisting of plural pixels being as one unit.

The DPCM unit 45 receives data from the block division unit 12 to implement DPCM to these data every block to transmit the data thus obtained to the code quantity converter 46. The code quantity converter 46 encodes these signals to which DPCM has been implemented every block to transmit the signals thus encoded to the calculating unit 44. Namely, also in this code quantity converter 46, signals to which DPCM has been implemented may be caused to undergo variable length encoding to output the code length thereof.

The calculating unit 44 is supplied with code quantity processed by different quantization steps from the code quantity converters 43-1 to 43-$n$, and is supplied, from the code quantity converter 46, with code quantity to which DPCM processing has been implemented. The calculating unit 44 determines assigned code quantities and select signals every respective blocks on the basis of inputted code quantities every respective blocks to output them to the main system 2. In this respect, in the case where total code quantity of equilength unit is determined at the calculating unit 44, since it is necessary to determine accumulated value of code quantities every blocks, it takes calculation time corresponding to one frame.

Figure 3:
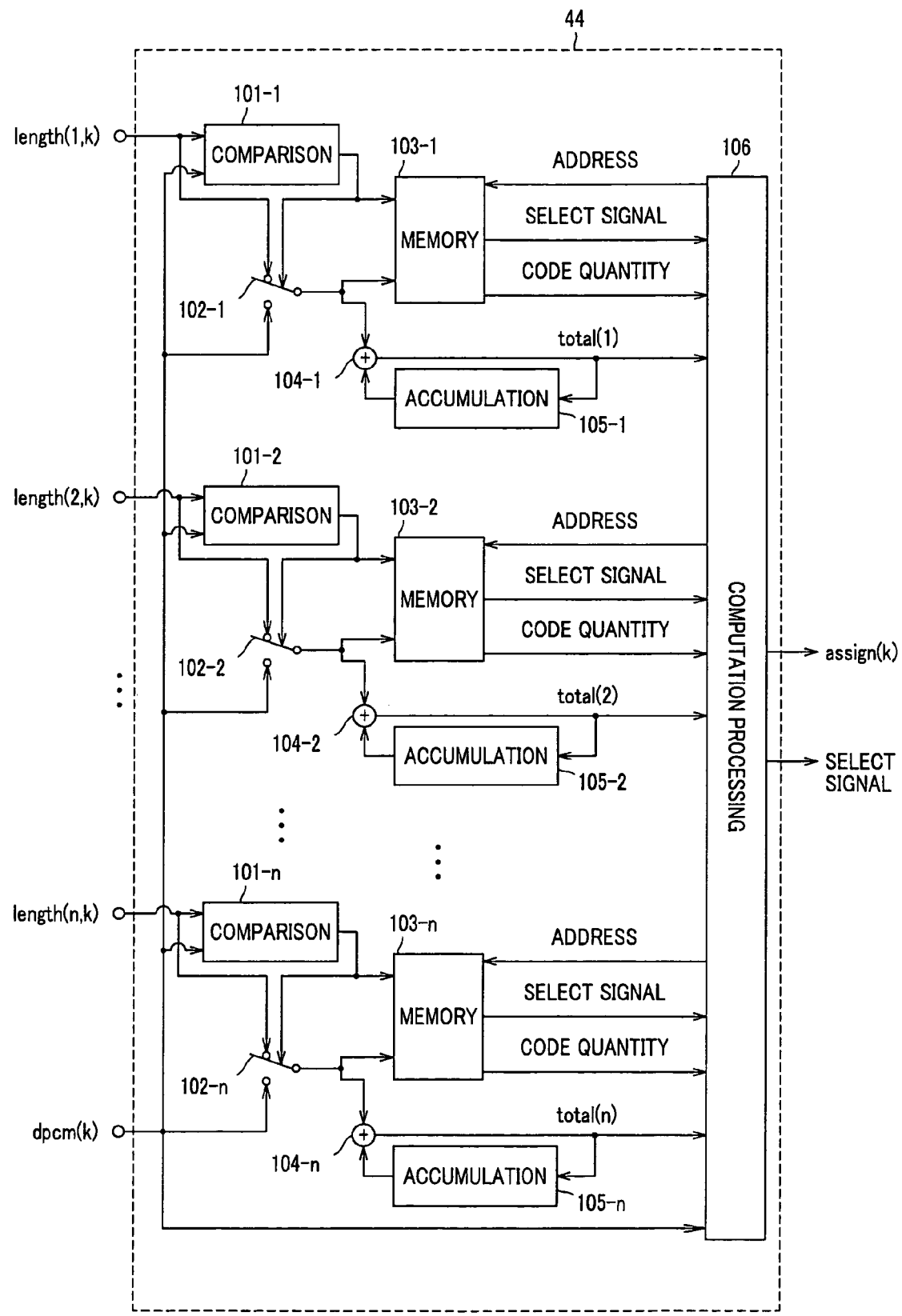
FIG. 3 is a view for explaining the internal configuration of the calculating unit.

Then, calculation of assigned code quantity by the calculating unit 44 will be explained. FIG. 3 shows a configuration example of the calculating unit 44. The calculating unit 44 comprises n comparison units 101-1 to 101-$n$, n selectors 102-1 to 102-$n$, n memories 103-1 to 103-$n$, n adders 104-1 to 104-$n$, n accumulation circuits 105-1 to 105-$n$, and a computation processing unit 106.

The comparison units 101-1 to 101-$n$ are supplied with code quantities length (1, k) to length (n, k) processed by different quantization steps from the code quantity converters 43-1 to 43-$n$ through the DCT path in regard to the k-th block, and are supplied with DPCM-processed code quantity dpcm (k) from the code quantity converter 46 through the DPCM path. For example, the comparison unit 101-1 is supplied with code quantity length (1,k) from the code quantity converting unit 43-1, and DPCM-processed code quantity dpcm (k). The comparison units 101-1 to 101-$n$ respectively select smaller code quantities between code quantities length (1,k) to length (n, k) inputted through the DCT path and code quantity dpcm (k) inputted through the DCT path. Further, the comparison units 101-1 to 101-n output select signal indicating that either code quantity is selected among code quantities length (1,k) to length (n, k) inputted through the DCT path and code quantity dpcm (k) inputted through the DPCM path.

The selectors 102-1 to 102-n respectively select code quantity delivered from the DCT path or code quantity delivered from the DPCM path in accordance with select signals delivered from the comparison units 101-1 to 101-n. For example, in the case where information to the effect that DCT path has been selected is included in the select signal, the selectors 102-1 to 102-n are turned ON to the DCT side. Code quantities selected by the selectors 102-1 to 102-n are delivered, as they are, to the memories 103-1 to 103-n and the adders 104-1 to 104-n.

The memories 103-1 to 103-n store select signals for identifying code quantities selected every respective blocks and code quantities selected at the selectors 102-1 to 102-n. Namely, code quantities and select signals which have been selected on block basis are stored by one frame in respective memories 103-1 to 103-n at the stage where processing of equi-length unit, e.g., one frame has been completed. In other words, either code quantities length (1,k) to length (n, k) inputted through the DCT path or code quantity dpcm (k) inputted through the DPCM path are stored in respective memories 103-1 to 103-n as code quantity selected on block basis. Accordingly, when the respective memories 103-1 to 103-n are combined together, code quantities and select signals which have been selected on block basis are stored by n number of values which is the number of quantization steps.

The adders 104-1 to 104-n and the accumulation circuits 105-1 to 105-n sequentially accumulate and add, by one frame, code quantities selected by the selectors 102-1 to 102-n. The code quantities added by one frame are caused to be respectively total code quantities total (1) to total (n). The accumulation circuits 105-1 to 105-n sequentially transmit the obtained total code quantities total (1) to total (n) to the computation processing unit 106.

Figure 4:
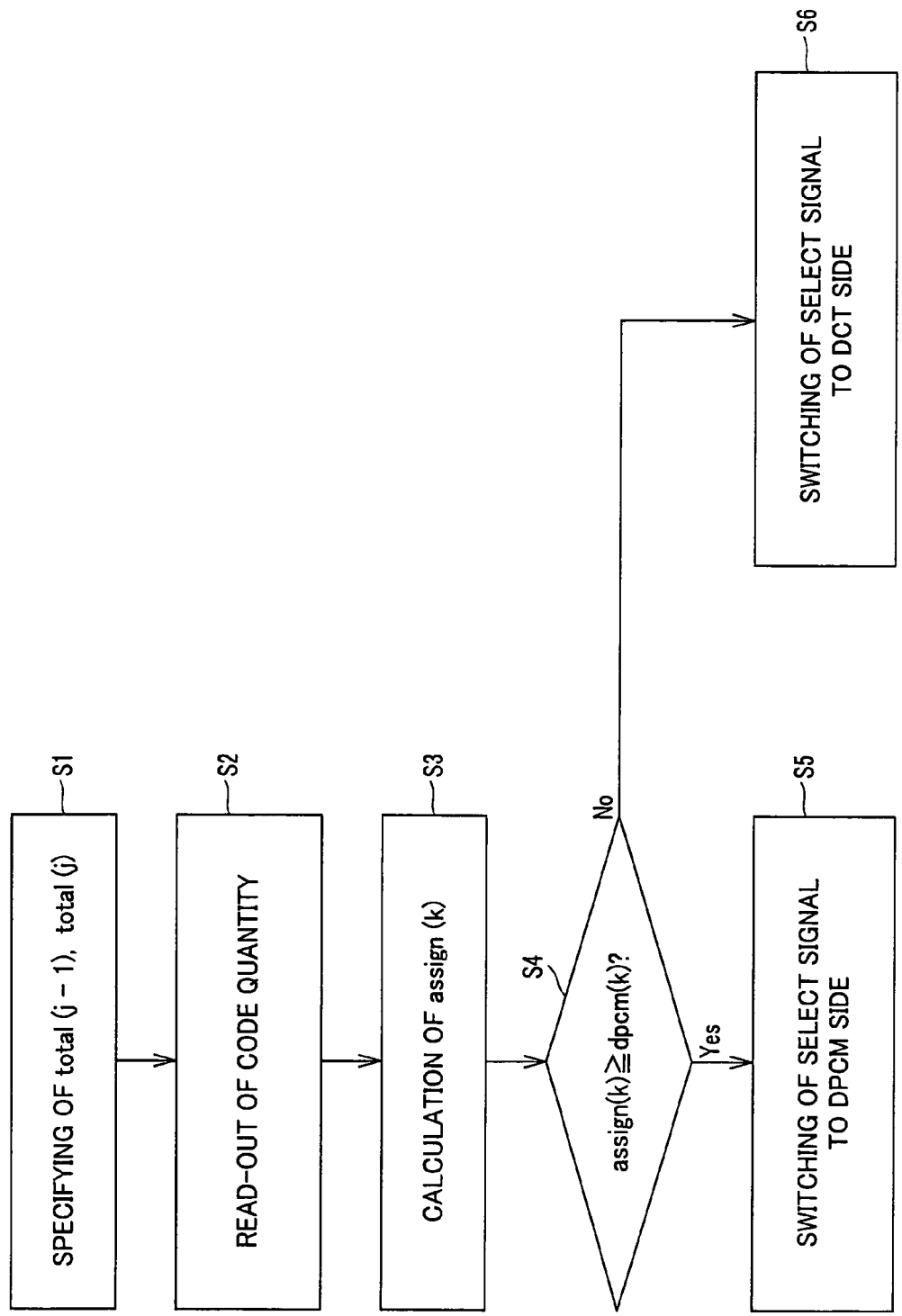
FIG. 4 is a flowchart showing processing procedure of computation processing unit.

The computation processing unit 106 executes the following procedure shown in the following FIG. 4 in the case where it respectively receives total code quantities total (1) to total (n) from the respective accumulation circuits 105-1 to 105-n. First, at step S1, the computation processing unit 106 compares target code quantity of equi-length unit and those total code quantities total (1) to total (n). Further, the computation processing unit 106 specifies total code quantity total (j−1) closest to target code quantity among total code quantities which exceed the taget code quantity. Namely, the total code quantity total (j−1) is code quantity immediately on the target code quantity, in other words, consists of minimum code quantity among total code quantity which exceeds the taget code quantity. Moreover, the computation processing unit 106 specifies total code quantity total (j) closest to the target code quantity among total code quantities less than target code quantity. Namely, the total code quantity total (j−1) is code quantity immediately below the target code quantity, in other words, consists of the maximum code quantity among total code quantity less than the target code quantity.

Then, processing shifts to step S2. Thus, the computation processing unit 106 reads out, on the basis of the total (j−1) and total (j) which have been identified, code quantities and select signals every respective blocks which are stored in the memory 103-j−1, and the memory 103-j. In this example, code quantity length (j−1, k) inputted through the DCT path or code quantity dpcm (k) inputted through the DPCM path is stored in the memory 103-j−1 as code quantity of the k-th block. For this reason, at the step S2, code quantity which is read out from the memory 103-j−1 results in length (j−1, k) or dpcm (k). Moreover, code quantity length (j, k) inputted through the DCT path or code quantity dpcm (k) inputted through the DPCM path is stored in the memory 103-j as code quantity of the k-th block. For this reason, code quantity which is read out from the memory 103-j at the step S2 results in length (j, k) or dpcm (k). In this respect, at steps subsequent thereto, code quantities and select signals every respective blocks which have been read out from the memory 103-j−1 and the memory 103-j are used.

Then, processing shifts to step S3. Thus, the computation processing unit 106 calculates assigned code quantities assign (k) with respect to respective blocks by using the linear interpolation.

Here, in the case where target code quantity of equi-length unit is M, code quantity which has been read out from the memory 103-j−1 is length (j−1, k), and code quantity which has been read out from the memory 103-j is length (j, k), assigned code quantity assign (k) is determined by the following formula (1).

$$\text{assign}(k) = \{(\text{total}(j-1)-M)*\text{length}(j, k)+(M-\text{total}(j))*\text{length}(j-1, k)\}/\{\text{total}(j-1)-\text{total}(j)\} \quad (1)$$

Moreover, in the case where code quantity which has been read out from the memory 103-j−1 is dpcm(k), and code quantity which has been read out from the memory 103-j is length (j,k), assigned code quantity assign (k) is determined by the following formula (2).

$$\text{assign}(k) = \{(\text{total}(j-1)-M)*\text{length}(j, k)+(M-\text{total}(j))*dpcm(k)\}/\{\text{total}(j-1)-\text{total}(j)\} \quad (2)$$

Further, in the case where code quantity which has been read out from the memory 103-j−1 is dpcm(k), and code quantity which has been read out from the memory 103-j is dpcm(k), assigned code quantity assign(k) is determined by the following formula (3).

$$\text{assign}(k) = \{(\text{total}(j-1)-M)*dpcm(k)+(M-\text{total}(j))*dpcm(k)\}/\{\text{total}(j-1)-\text{total}(j)\} \quad (3)$$

As described above, assigned code quantities assign(k) assigned every respective blocks are determined, thereby making it possible to realize efficient code quantity control which has small loss of code quantity with respect to the target code quantity.

Then, processing shifts to step S4. Thus, the computation processing unit 106 finally compares assign (k) determined every respective blocks with dpcm(k) every respective blocks. As a result, when assign (k) is dpcm(k) or more, processing shifts to step S5. Moreover, in the case where assign(k) is below dpcm(k), processing shifts to step S6.

In the case where processing shifts to step S5, even if encoding is made through DPCM path having image quality with respect to corresponding block k, processing at this step means that total code quantity can be held down target code quantity or less. In such case, the computation processing unit 106 serves to switch select signal to the DPCM side to replace assign (k) by dpcm (k) to output it.

In the case where processing shifts to step S6, since code quantity by the DPCM path is larger than code quantity estimated by determining assign (k) as described above with respect to corresponding block k, a method of selecting the DCT side permits total code quantity to be lower than the target code quantity. For this reason, the computation processing unit 106 serves to set select signal to the DCT side to output the determined assign (k) as it is.

At the computation processing unit 106, assign(k) and dpcm(k) can be considered as priority in connection with the fact that either one of the DCT path and the DPCM path is selected. As long as there is employed any method of selecting either DCT path or DPCM path on the basis of the priority, any selection method may be applied. For example, in the case where their priorities are equal, it is sufficient to select any one of DCT path and DPCM path, or it is sufficient to select DPCM path.

Moreover, the priority at the step S4 is not limited to the case based on assign(k) and dpcm(k). Namely, when corresponding priority is based on a predetermined priority in the comparison at the step S4, even if, e.g., assign(k) is dpcm(k) or more, there are instances where processing may shift to step S6.

From the prediction system 4, assigned code quantity assign (k) outputted from the computation processing unit and select signal are outputted. The outputted assigned code quantity assign (k) is delivered to the binary search unit 24.

In the case where the select signal is set to the DCT side, the binary search unit 24 determines quantization step so that generated code quantity of block falls within the target code quantity. In determining the quantization step, the binary search unit 24 may employ a method proposed in the Japanese Patent Application No. 110858/1992 publication, or may determine quantization step by any other method. By utilizing the fact that generated code quantity monotonously decreases with respect to increase of quantization step, quantization step is determined by the binary search method. By the determined quantization step, quantization is made by the quantizer 25. It is to be noted that the binary search method is only example, but any system such that generated code quantity of block falls within the target code quantity may be employed.

On the other hand, in the case where select signal is switched to the DPCM side, the selector 30 is switched to the DPCM path. Thus, encoding through DPCM is performed with respect to corresponding block.

It is to be noted that in the case where the computation processing unit 106 cannot respectively discriminate total (j−1), total(j) immediately above and immediately below the target code quantity, it is impossible to determine assigned code quantity assign(k) by so-called interpolation which puts target code quantity between total(j−1) and total(j). In such case, by so-called extrapolation in which target code quantity is not put therebetween and using two total(j−1) and total(j) which are closest to the target code quantity, assign(k) is determined. Also in such extrapolation, assigned code quantity assign(k) is calculated by using the above-mentioned formulas (1) to (3). However, there are instances where even if encoding is made through the DPCM path for the reason because code quantity of the DPCM path is small in such instance, code quantity results in remainder in its turn. In such a case, as indicated by the flowchart shown in FIG. 5, assign (k) and total code quantity total_tmp(total number corresponding to one frame of assign(k)) are replaced by one farther from the target code quantity among two values of total(j−1) and total (j) to calculate assign(k).

Figure 5:
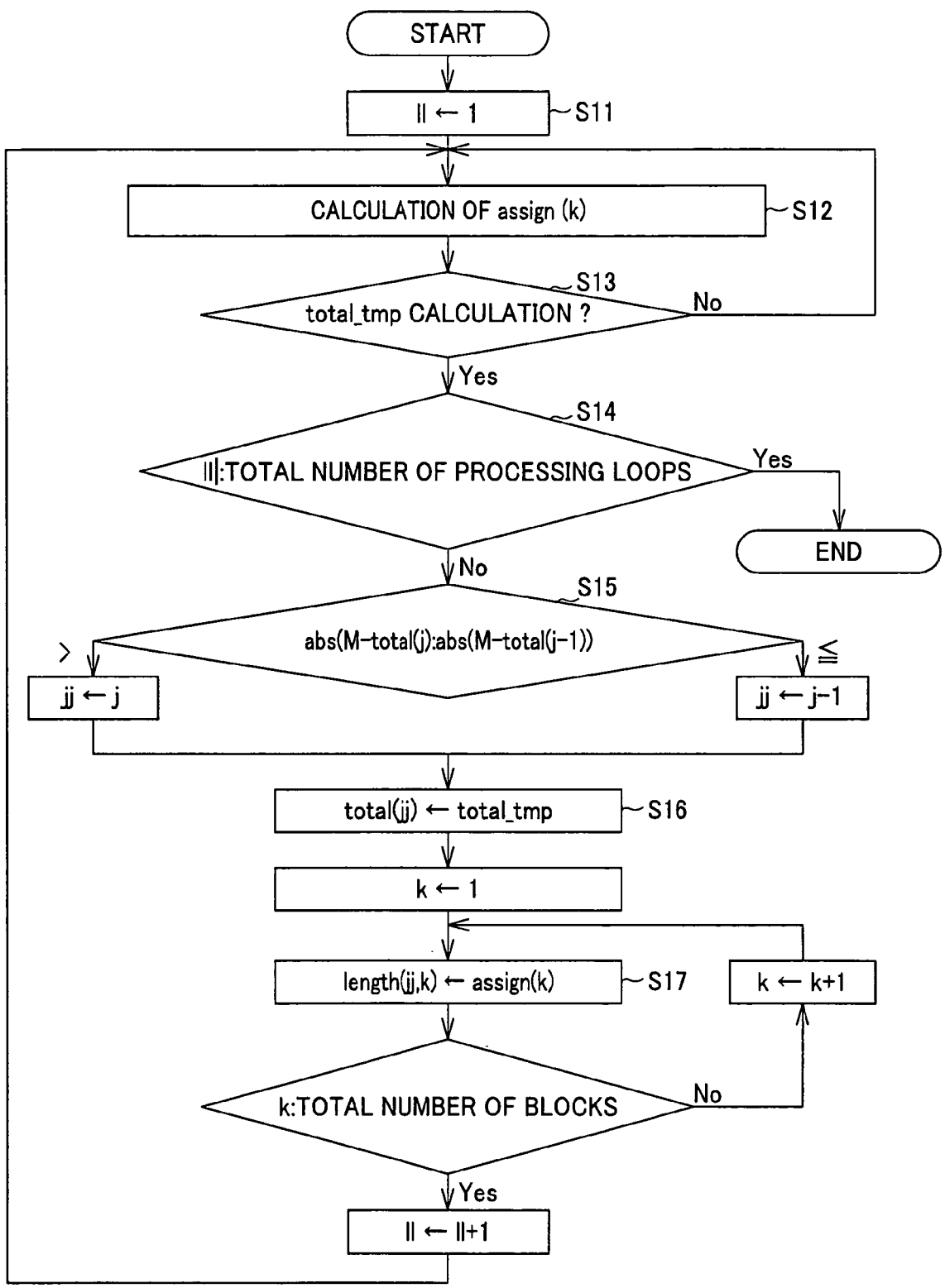
FIG. 5 is a flowchart for explaining the case where value is replaced by value apart from target code quantity among total (j−1) and total (j) to calculate assign (k).

In the flowchart shown in FIG. 5, first, at step S11, processing loop 11 is set to initial value. Thus, processing shifts to step S12. At the step S12, assign(k) is calculated by the above formula by using total(j−1) and total(j) which are closest to target code quantity. Thus, processing shifts to step S13. At the step S13, values of assign (k) are determined with respect to all blocks to thereby judge whether or not total code quantity total_tmp corresponding to one frame can be determined. Only in the case where total code quantity total_tmp is only determined, processing shifts to step S14. In the case where total code quantity total_tmp is not determined, processing of the step S12 is repeated.

Then, processing shifts to step S14 to judge whether or not current loop 11 reaches the total number of processing loops. Here, in the case where the current loop 11 reaches the total number of processing loops, the fact that desired assign (k) has been determined is indicated after repetitive processing. Thus, processing drops out from the loop. On the other hand, in the case where the current loop 11 does not reach the total number of processing loops, processing shifts to step S15. In this case, the total number of processing loops can be arbitrarily set to, e.g., five (5).

At step S15, whether either extracted total (j−1) or extracted total (j) is close to the target code quantity is judged. In concrete terms, abs (M−total(j)) and (M−total (j−1)) are compared with each other to judge whether or not either value is large. As a result, in the case where abs (M−total(j))>abs (M−total (j−1)), variable jj is replaced by j. On the other hand, in the case where abs (M−total(j))≦abs (M_total(j−1)), variable jj is replaced by j−1. (In this case, this abs ( ) means absolute value). Namely, value far from total code quantity M is selected among the extracted total (j−1) and the extracted total (j). Selected values are respectively substituted for variable jj.

Then, at step S16, total code quantity total_tmp corresponding to one frame is caused to be total (jj). Thus, total code quantity total_tmp corresponding to one frame can be replaced into total (j−1) or total(j) far from total code quantity M.

Then, processing shifts to step S17 to assign assign (k) determined with respect to respective blocks to length (jj, k) every respective blocks. Thus, processing shifts to the next loop 11. In the case where assign (k) is determined for a second time, it is possible to take, into consideration, length (jj, k) in which value is assigned.

As explained above in detail, the image encoding compression apparatus 1 according this embodiment can select code quantity from DCT path or DPCM path efficiently and in a manner to satisfy target code quantity every block. Moreover, code quantity from the DPCM path is preferentially selected, thereby making it possible to prevent deterioration of image quality. Thus, efficient code quantity control can be realized without exceeding capacity of recording media like VTR, etc. Further, distortion in the compression process of image can be reduced. In addition, since quantization step can be determined by using the binary search method, the number of quantization steps at the prediction unit 4 can be suppressed. This is advantageous in view of hardware to such a degree that the circuit configuration can be simplified.

Figure 6:
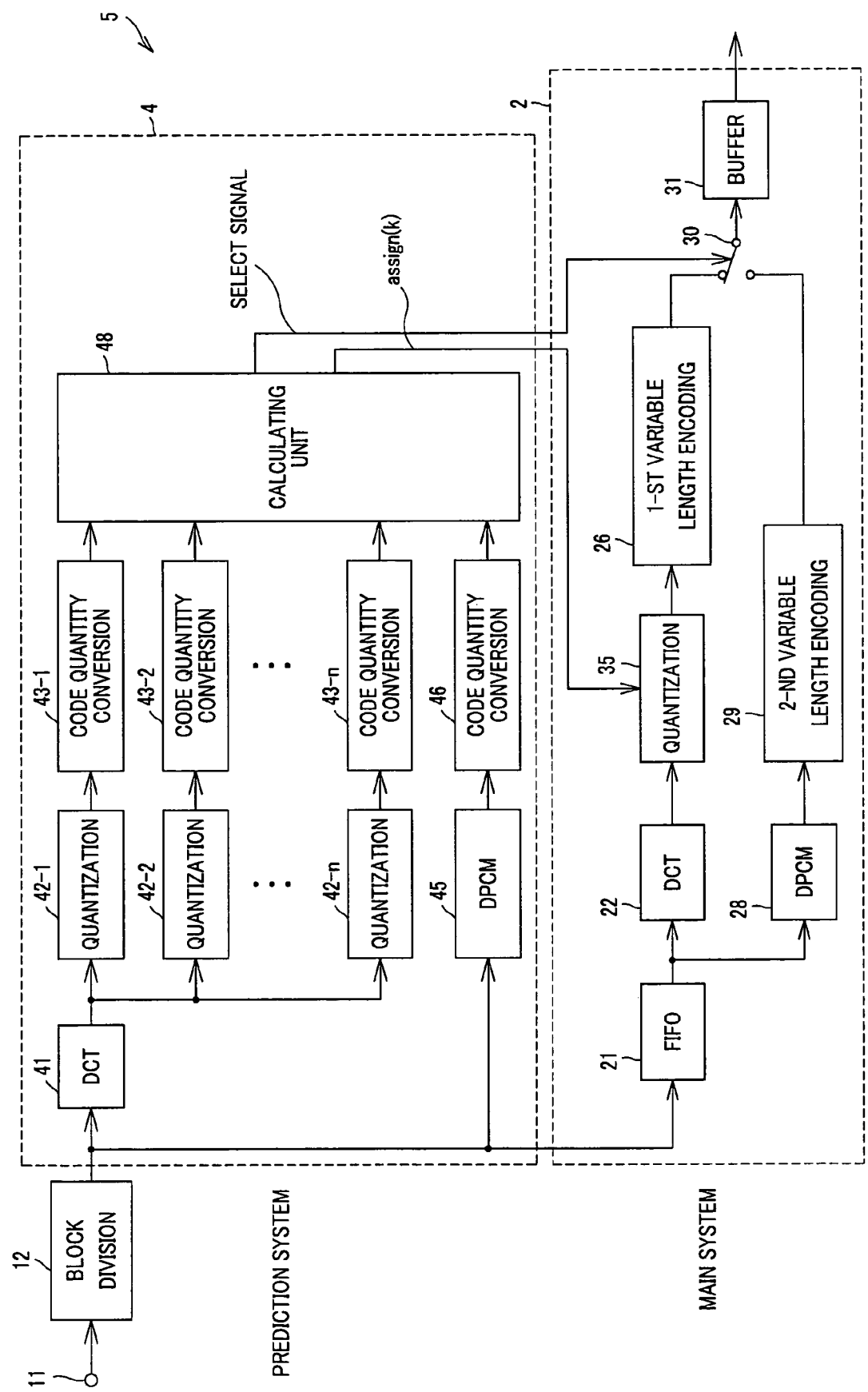
FIG. 6 is a view showing the configuration of an image compression encoding apparatus which does not use the binary search method.

It is to be noted that this embodiment is not limited to the above-mentioned description. This embodiment may also applied to the configuration in which search unit such as binary search unit, etc. is not used like image compression encoding apparatus 5 shown in FIG. 6, for example. It should be noted that explanation of the image compression encoding apparatus 1 is quoted with respect to the same circuit components as those of the above-described image compression encoding apparatus 1, and their explanation will be omitted.

The image compression encoding apparatus 5 is supplied with an image signal consisting of a luminance signal Y and color difference signal Pb, Pr through a terminal 11. The block dividing unit 12 divides an inputted image signal of one frame into, e.g., 8×8 blocks to transmit them to the main system 2 and the prediction system 4.

The main system 2 comprises a DCT path composed of a FIFO (First In First Out) memory 21, a DCT unit 22, a quantization unit 35 and a first variable encoding unit 26, a DPCM path composed of a DPCM unit 28 and a second variable length encoding unit 29, a selector 30, and a buffer 31.

The quantization unit 35 quantizes DCT coefficients inputted from the DCT unit 22 on the basis of quantization step determined on block basis. The quantization unit 35 delivers the quantized data (hereinafter referred to as quantization level) to the variable length encoding unit 26.

The selector 30 suitably switches various data which have been caused to undergo variable length encoding by the first variable length encoding unit 26 and/or the second variable length encoding unit 29 to output the data thus obtained together with corresponding switching information. In this respect, there are instances where the selector 30 may be switched on the basis of select signal delivered from the prediction system 4.

The prediction system 4 comprises a DCT path composed of a DCT unit 41, n quantizers 42-1 to 42-$n$ and n code quantity converters 43-1 to 43-$n$, a DPCM path composed of a DPCM unit 45 and a code quantity converter 46, and a calculating unit 48. In this respect, the number n of processing stages of DCT path at the prediction system 4 corresponds to total number of quantization steps. This is because since prediction can be tried by many quantization steps as compared to the image compression encoding apparatus 1 employing the binary search method, high accuracy quantization control can be realized.

The calculating unit 48 is supplied with code quantities processed by different quantization steps from the code quantity converters 43-1 to 43-$n$, and is supplied with DPCM-processed code quantity from the code quantity converter 46. The calculating unit 48 determines assigned code quantities and select signals every respective blocks on the basis of code quantities every these inputted respective blocks to output them to the main system 2. The assigned code quantities outputted to the main system 2 are sent to the quantization unit 35. Moreover, select signals are sent to the selector 30. In this respect, in the case where, e.g., total code quantity of one frame is determined at the calculating unit 48, it is necessary to determine accumulated value of code quantities every block. For this reason, calculation time corresponding to one frame is required.

Figure 7:
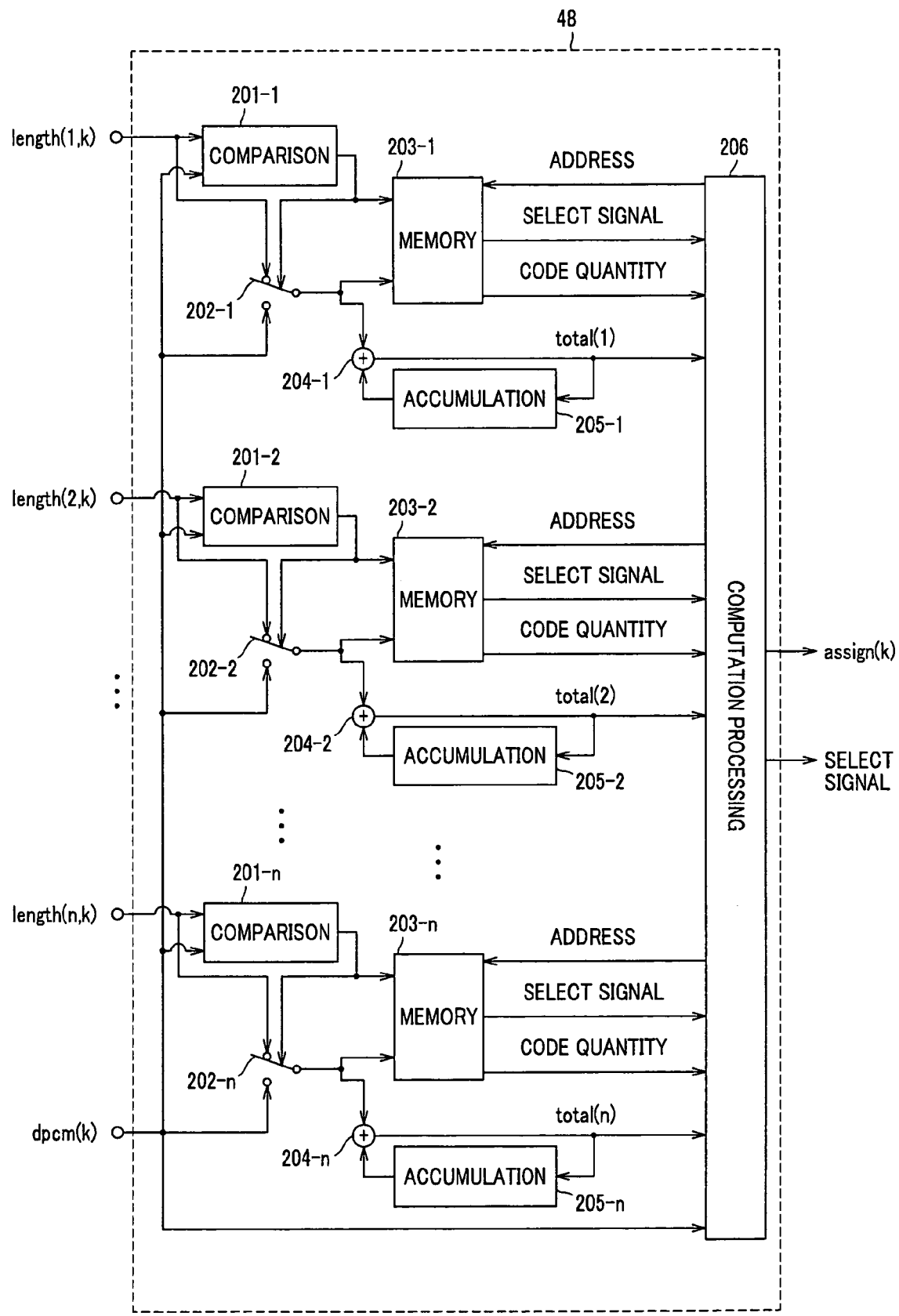
FIG. 7 is a view for explaining calculating unit at the image compression encoding apparatus which does not use the binary search method.

Then, calculation of assigned code quantity by the calculating unit 48 will be explained. FIG. 7 shows a configuration example of the calculating unit 48. The calculating unit 48 comprises n comparison units 201-1 to 201-$n$, n selectors 202-1 to 202-$n$, n memories 203-1 to 203-$n$, n adders 204-1 to 204-$n$, n accumulation circuits 205-1 to 205-$n$, and a computation processing unit 206.

The comparison units 201-1 to 201-$n$ are supplied with code quantities length (1, k) to length (n, k) processed by different quantization steps from code quantity converters 43-1 to 43-$n$ through DCT path, and are supplied with DPCM-processed code quantity dpcm (k) from the code quantity converter 46 through DPCM path. For example, the comparison unit 201-1 is supplied with code quantity length (1, k) from the code quantity converting unit 43-1 and DPCM-processed code quantity dpcm (k). The comparison units 201-1 to 201-$n$ select smaller one with respect to code quantities length (1, k) to length (n, k) inputted through the DCT path and code quantity dpcm (k) inputted through the DPCM path to output a select signal including selected information.

The selectors 202-1 to 202-$n$ respectively select code quantity delivered from the DCT path or code quantity delivered from the DPCM path in accordance with select signals delivered from the comparison units 201-1 to 201-$n$. For example, in the case where information to the effect that DCT path is selected is included in select signal, the selectors 202-1 to 202-$n$ are turned ON to the DCT side. The code quantities selected by the selectors 202-1 to 202-$n$ are delivered to the memories 203-1 to 203-$n$ and the adders 204-1 to 204-$n$ as they are.

The memories 203-1 to 203-$n$ store select signals and code quantities every respective blocks. Namely, at the stage where processing corresponding to one frame is completed, code quantities and select signals which have been selected on block basis are stored in the memories 203-1 to 203-$n$ by n number of values which is the number of quantization steps.

The adders 204-1 to 204-$n$ and the accumulation circuits 205-1 to 205-$n$ sequentially accumulate and add, by one frame, code quantities selected by the selectors 202-1 to 202-$n$. The code quantities added by one frame are caused to be respectively total code quantities total (l) to total (n). The accumulation circuits 205-1 to 205-$n$ sequentially transmit obtained total code quantities total (l) to total (n) to the computation processing unit 206.

The computation processing unit 206 respectively receives total code quantities total (l) to total (n) from respective accumulation circuits 205-1 to 205-$n$. The computation processing unit 206 compares target code quantity corresponding to one frame and these total code quantities total (l) to total (n) to specify total code quantity total (j−1) which is greater than the target code quantity and total code quantity total (j) which is less than target code quantity. Namely, the total (j−1) and the total (j) designate value existing in such a manner to put target code quantity therebetween, and j indicates maximum value of j which satisfies total (j−1)>target code quantity.

The computation processing unit 206 estimates optimum code quantities every blocks with reference to n quantization steps on the basis of the calculated total code quantity. Further, the computation processing unit 206 determines assign (k) on the basis of the estimated code quantity every corresponding blocks to transmit them to the above-described quantization unit 35.

As explained in detail above, the image encoding compression apparatus 5 according to this embodiment can select, every block, code quantity from the DCT path or the DPCM path quantitized by plural quantization steps efficiently and in a manner to satisfy target code quantity. Moreover, at this computation processing unit 106, in the case where assign (k) and dpcm (k) are caused to be so-called priority and these priorities have the same level, DPCM path is preferentially selected to thereby have ability to prevent deterioration of image quality. Thus, efficient code quantity control can be realized without exceeding capacity of recording media like VTR, etc. As a result, distortion in the compression process of image can be reduced. Further, in conducting encoding by the DCT path, high accuracy quantizationn control can be expected. It is to be noted that this embodiment is not limited to the case where selection is made on the basis of priority.

Figure 8:
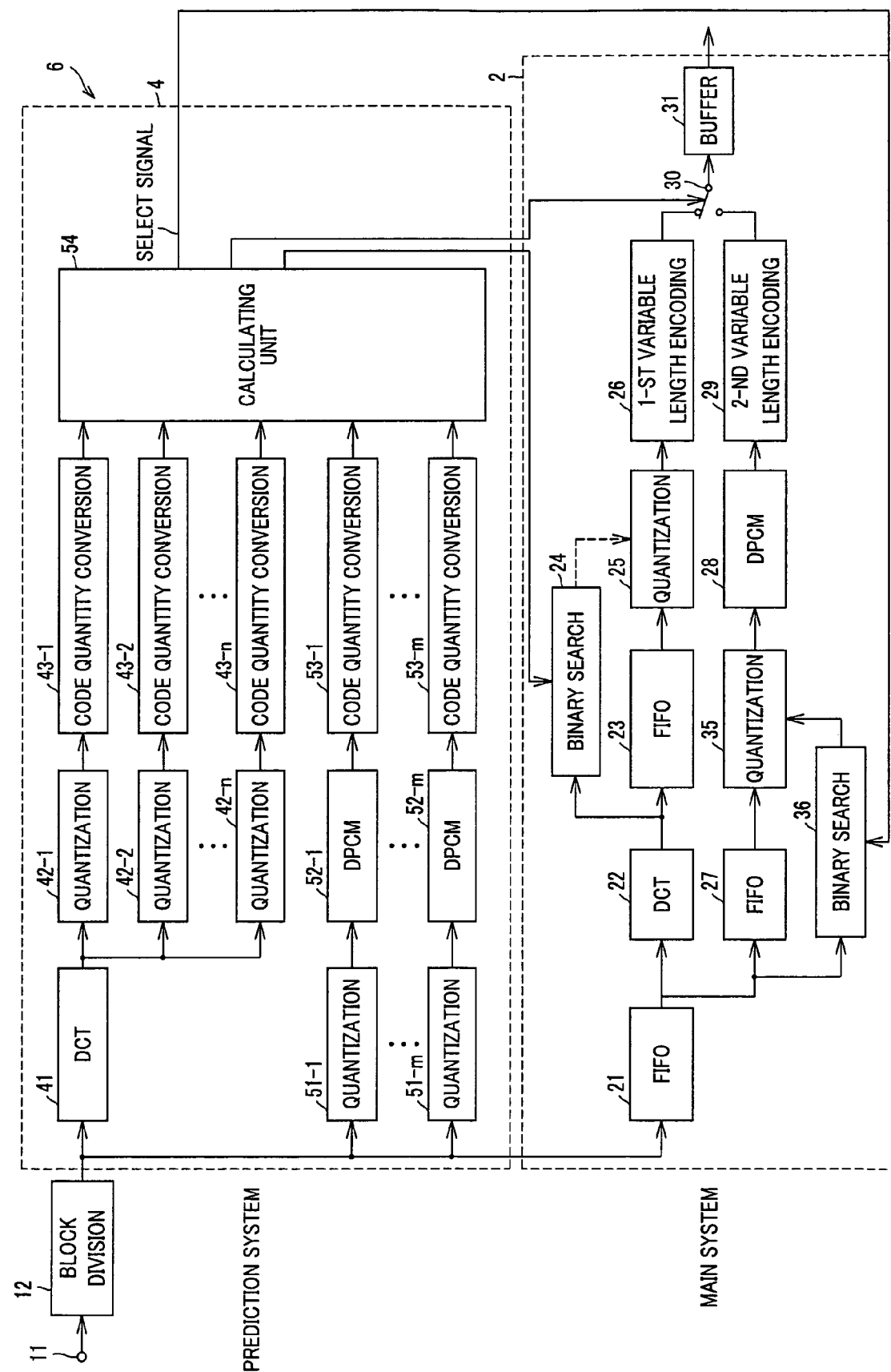
FIG. 8 is a view showing the configuration of an image compression encoding apparatus in which quantization is performed with respect to DPCM.

It should be noted that this embodiment can be further applied to the configuration in which quantization is performed with respect to DPCM like the image compression encoding apparatus 6 shown in FIG. 8. The detail of the image compression encoding apparatus 6 will be explained. It should be noted that explanation of the image compression encoding apparatus 1 is quoted with respect to the same circuit components as those of the above-described image compression encoding apparatus 1, and their explanation will be omitted.

The image compression encoding apparatus 6 is supplied with an image signal consisting of luminance signal Y and color difference signals Pb, Pr through terminal 11. The block dividing unit 12 serves to divide an inputted image signal of one frame into, e.g., 8×8 blocks to transmit them to the main system 2 and the prediction system 4.

The main system 2 comprises a DCT path composed of a FIFO (First In First Out) memory 21, a DCT unit 22, a FIFO memory 23, a binary search unit 24, a quantization unit 25 and a first variable length encoding unit 26, a DPCM path composed of a FIFO memory 27, a quantization unit 35, a DPCM unit 28, a second variable length encoding unit 29 and a binary search unit 36, a selector 30, and a buffer 31.

The quantization unit 35 receives data stored in the FIFO memory 27 to quantize the data thus received by quantization step determined by the binary search unit 36 on block basis. The quantization unit 35 delivers the quantized data to the DPCM unit 28.

Namely, data is passed through the DPCM path involving quantization so that any distortion is added in the process of compression of image. For this reason, in the case where either DCT path or DPCM path is selected, it is necessary to preferentially select data in which distortion is small in the process of compression in addition to the fact that data in which code quantity is small is caused to be preferential. In concrete terms, distortion by compression depends upon quantization, and takes place in accordance with quantization step with respect to respective DCT and DPCM. For this reason, it is necessary to add code quantity from DCT path involving quantization to code quantity from DPCM path similarly involving quantization to compare distortions of image to send select signal to the main system 2.

The example for realizing such prediction system 4 will be explained below. The prediction system 4 comprises, as shown in FIG. 8, a DCT path composed of a DCT unit 41, n quantizers 42-1 to 42-*n* and n code quantity converters 43-1 to 43-*n*, a DPCM path composed of m quantizers 51-1 to 51-*m* DPCM units 52-1 to 52-*m* and m code quantity converting units 53-1 to 53-*m*, and a calculating unit 54.

The m quantizers 51-1 to 51-*m* receive image signals on block basis to quantize them by quantization steps different from each other. Namely, also in the DPCM path, it becomes possible to perform sampling by m quantization steps.

The DPCM units 52-1 to 52-*m* implement DPCM every blocks with respect to the quantized image signals to deliver the image signals thus obtained to the code quantity converting units 53-1 to 53-*m*. The code quantity converting units 53-1 to 53-*m* encode these DPCM processed signals every block to output them to the calculating unit 54.

The calculating unit 54 is supplied, from the DCT path side, with code quantity, etc. processed by different quantization steps other from the code quantity converters 43-1 to 43-*n*, and is supplied, from the DPCM path side, with DPCM-processed code quantities quantized by different quantization steps, etc. The calculating unit 54 compares these inputted code quantities and distortions of image every respective blocks to determine assigned code quantities and select signals every respective blocks to output them to the main system 2. It is to be noted that there may be employed in the prediction system 4 the configuration in which DPCM units 52-1 to 52-*m* and quantizers 51-1 to 51-*m* are replaced. Thus, first, at the DPCM units 52-1 to 52-*m*, it is possible to quantize DPCM processed signal by quantization steps different from each other.

Figure 9:
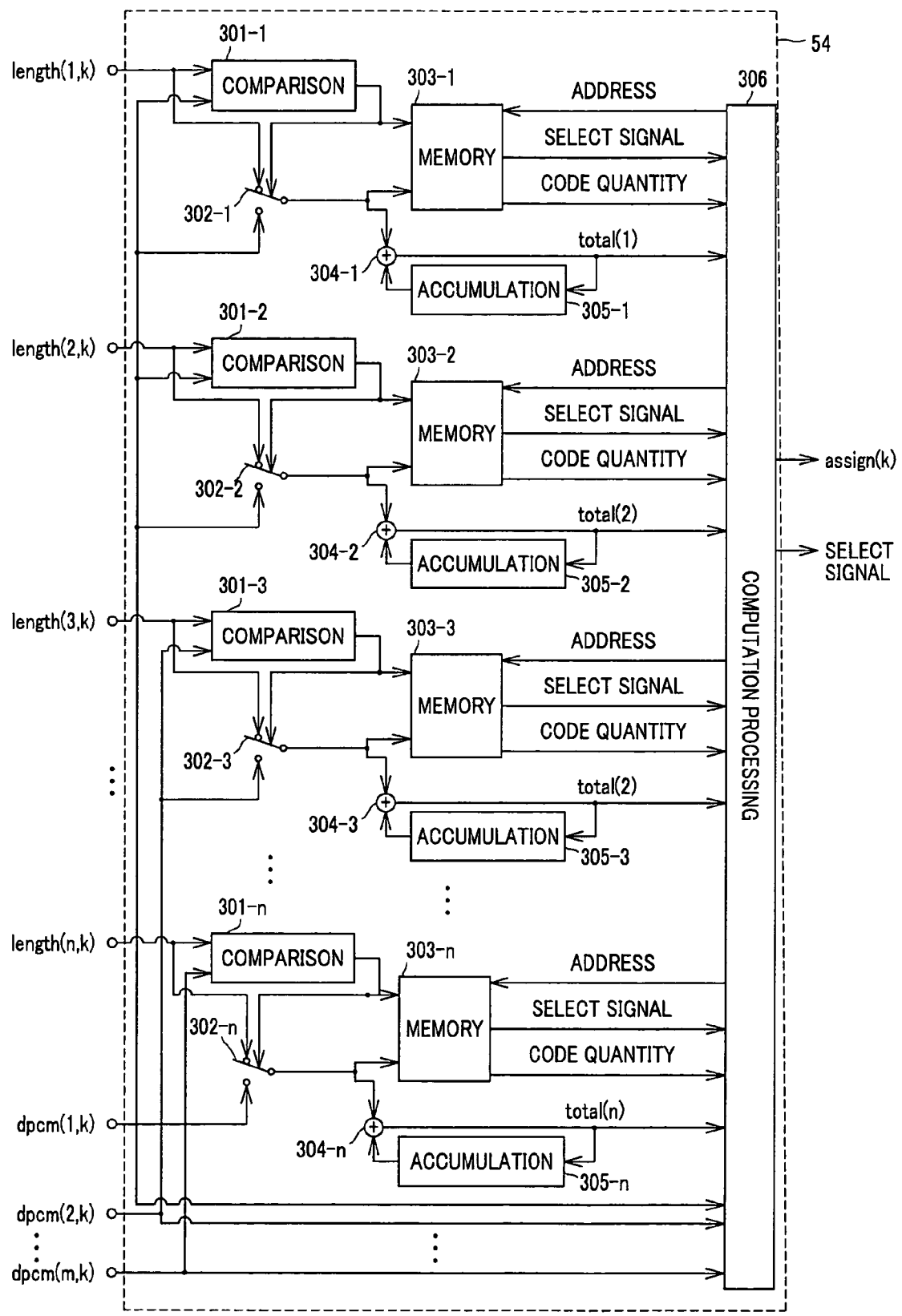
FIG. 9 is a view for explaining calculating unit at an image compression encoding apparatus in which quantization is performed with respect to DPCM.

Then, calculation of assigned code quantity by the calculating unit 54 will be explained. FIG. 9 shows a configuration example of the calculating unit 54. The calculating 54 comprises n comparison units 301-1 to 301-*n*, n selectors 302-1 to 302-*n*, n memories 303-1 to 303-*n*, n adders 304-1 to 304-*n*, n accumulation circuits 305-1 to 305-*n*, and a computation processing unit 306.

The comparison units 301-1 to 301-*n* are supplied with code quantities length (1,k) to length (n, k) processed by different quantization steps from the code quantity converters 43-1 to 43-*n* through DCT path, and are supplied with DPCM processed code quantities dpcm (1,k) to dpcm (m, k) from code quantity converters 53-1 to 53-*m* through the DPCM path. In this case, the comparison units 301-1 to 301-*n* compare code quantity at the DCT path and code quantity at the DPCM path in which distortion is smaller as compared to code quantity at the DCT path. In this respect, in the example shown in FIG. 9, dpcm (1,k) inputted to the comparison unit 301-1 or the comparison unit 301-2 has distortion smaller than length (1,k) or length (2,k), and dpcm (3,k) inputted to the comparison unit 301-3 has distortion smaller than that of length (3,k).

The comparison units 301-1 to 301-*n* select smaller one with respect to inputted code quantity from the DCT path and code quantity from the DPCM path to output select signals including selected information. Thus, it becomes possible to output select signals in a manner to satisfy target code quantity while suppressing distortion by compression of image.

The selectors 302-1 to 302-*n* respectively select code quantities delivered from the DCT path or code quantities delivered from DPCM path in accordance with select signals delivered from the comparison units 301-1 to 301-*n*. For example, in the case where information to the effect that DCT path has been selected is included in select signal, the selectors 302-1 to 302-*n* are turned ON to the DCT side. The code quantities selected by the selectors 302-1 to 302-*n* are delivered to memories 303-1 to 303-*n* and adders 304-1 to 304-*n* as they are.

The memories 303-1 to 303-*n* store select signals and code quantities every respective blocks. Namely, at the stage where processing corresponding to one frame has been completed, there results the state where code quantities and select signals which have been selected on block basis are stored in the memories 303-1 to 303-*n* by n number of values which is the number of quantization steps.

The adders 304-1 to 304-*n* and the accumulation circuits 305-1 to 305-*n* sequentially accumulate and add code quantities selected by the selectors 302-1 to 302-*n* by one frame. The code quantities added by one frame are caused to be respectively total code quantities total (1) to total (n). The accumulation circuits 305-1 to 305-*n* sequentially transmit the obtained total code quantities total (1) to total (n) to the computation processing unit 306.

The computation processing unit 306 respectively receives total code quantities total (1) to total (n) from respective accumulation circuits 305-1 to 305-*n*. The computation processing unit 306 compares target code quantity corresponding to one frame and these total code quantities total (1) to total (n) to specify total code quantity total (j−1) which is grater than target code quantity and total code quantity total (j) which is less than the target code quantity. Explanation of the calculating unit 44 at the image compression encoding apparatus 1 is quoted with respect to calculation of assigned code quantities assign (k) based on these specified code quantities, and their explanation will be omitted.

In this way, from the prediction system 4, assigned code quantity assign (k) and select signal which are outputted from the computation processing unit are outputted. The outputted assigned code quantity assign (k) is delivered to the binary search units 24, 36.

In the case where the select signal is at the DCT side, the binary search units 24, 36 determine quantization step so that generated code quantity of block falls within the target code quantity. The quantization units 25, 35 at the main system 2 implement quantization on block basis on the basis of the determined quantization step.

Figure 10:
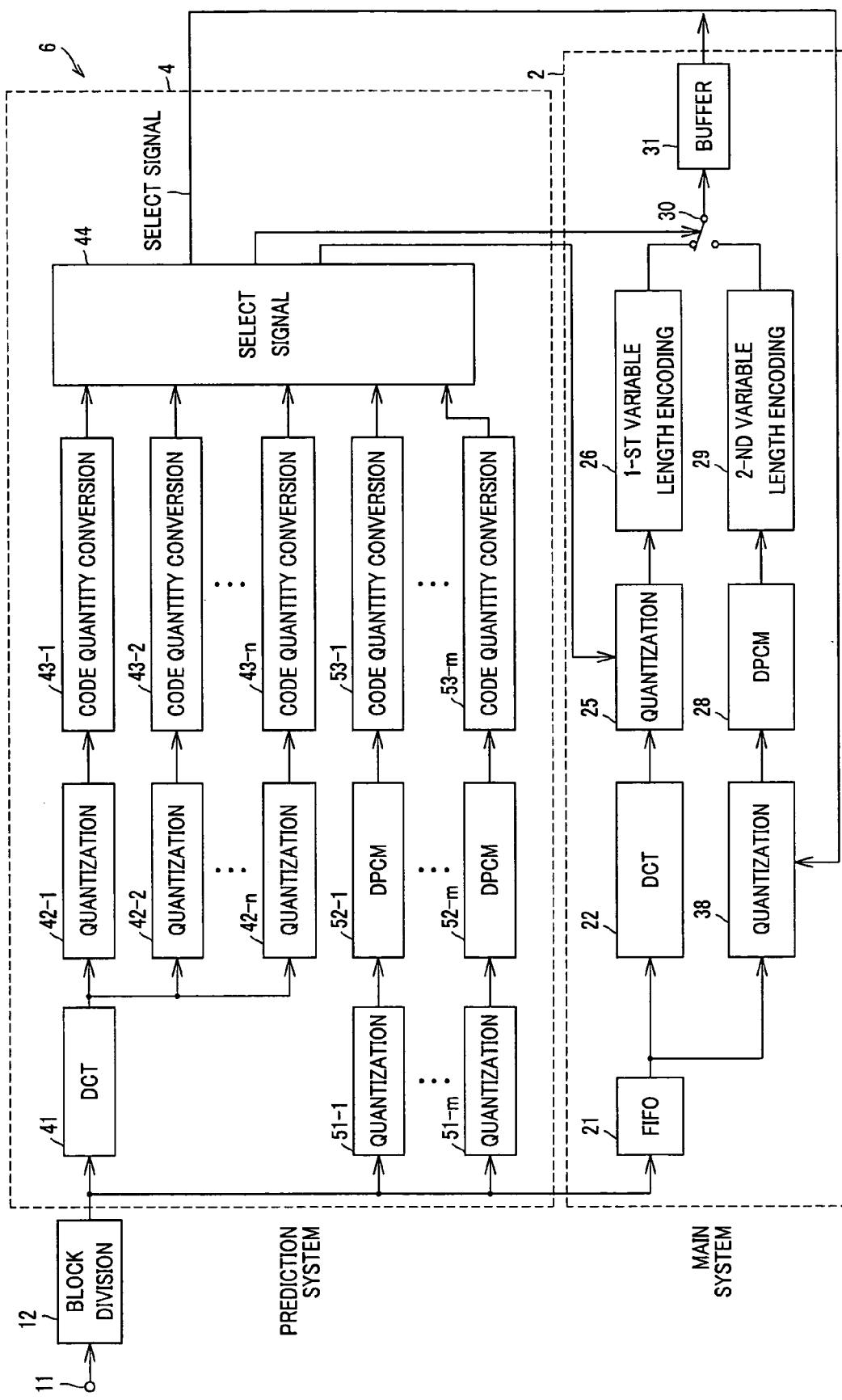
FIG. 10 is a view for explaining the case where the binary search method is not used at the image compression encoding apparatus in which quantization is performed with respect to DPCM.

It is to be noted that the image compression encoding apparatus 6 is not limited to the configuration shown in FIG. 8, but may be also applied to, e.g., configuration which does not use the binary search method as shown in FIG. 10.

In the example of the image compression encoding apparatus 6 shown in FIG. 10, the quantization unit 35 quantizes DCT coefficients inputted from the DCT unit 22 on the basis of quantization steps determined on block basis. The quantization unit 35 delivers the quantized data to the variable length encoding unit 26.

A computation processing unit 306 estimates optimum code quantities every blocks with reference to n quantization steps on the basis of the calculated total code quantity. Further, the computation processing unit 306 determines quantization step on the basis of the estimated code quantities every the blocks to transmit them to the above-described quantization unit 35. Thus, since prediction can be tried by many quantization steps as compared to the image compression encoding apparatus 6 shown in FIG. 8 employing the binary search method, high accuracy quantization control can be realized.

As explained in detail above, the image encoding compression apparatus 6 according to this embodiment can select, every block, code quantities from the DCT path or the DPCM path which have been quantized by plural quantization steps efficiently and in a manner to satisfy the target code quantity. Moreover, in the case where code quantity from the DPCM path is preferentially selected, deterioration of image quantity can be prevented. Thus, efficient code quantity control can be realized without exceeding capacity of recording media such as VTR, etc. Thus, distortion in the compression process of image can be reduced.

It is to be noted that this embodiment is not limited to the case applied to image compression encoding apparatuses 1, 5, 6. For example, respective components of the image compression encoding apparatuses 1, 5, 6 may be disposed on transmission path to thereby realize efficient code quantity control also on transmission path. Thus, distortion in compression process of image can be reduced.

It is to be noted that while, in this embodiment, DCT is implemented every block to thereby generate DCT coefficients to thereby perform reversible image compression, the present invention is not limited to such a case. Moreover, also with respect to irreversible image compression system, the present invention is not limited to DPCM. Namely, there may be employed a system using a first compression system and a second compression system having compression factor and loss which are lower than those of the first compression system.

Moreover, the present invention can be applied also to an image compression encoding apparatus and an image compression encoding method, and a program in which switching between the first compression system and the second compression system can be made.

The image compression encoding apparatus is directed to image compression encoding apparatus adapted for selecting, on encoding system selection basis, a first compression system of quantizing an input image by quantization steps different from each other, or a second compression system having a compression factor and loss which are lower than those of the first compression system, the image compression encoding apparatus comprises: selection unit for selecting, on encoding system selection basis, either the first encoding system or the second compression system to send a select signal with respect to the selected compression system; switching unit for taking thereinto code quantity by the first compression system or the code quantity by the second compression system in accordance with the sent select signal; calculating unit for adding, on the encoding system selection basis, code quantities which have been taken thereinto through the switching unit to thereby calculate total code quantity of the encoding system selection basis; and control unit for conducting a control such that total code quantity calculated every the quantization step becomes close to target code quantity of the equi-length unit.

In the image compression encoding apparatus, the control unit may conduct a control so as to linearly interpolate total code quantities calculated every the quantization steps so that it becomes close to the target code quantity of the equi-length unit. Moreover, the selector unit may select smaller one of code quantity of the first compression system or the second compression system. Further, in the first compression system, DCT (Discrete Cosine Transform) of an input image signal may be performed to quantize the image signal which has been caused to undergo DCT. Further, in the second compression system, encoding may be made by the reversible encoding (Lossless) system. Further, in the second compression system, an input image signal may be encoded by DPCM (Differential Pulse code Modulation). In addition, the control unit may conduct a control so that code quantity does not exceed the target code quantity with respect to the total code quantity.

The image compression encoding method is directed to image compression encoding system of selecting, on encoding system selection system basis, a first compression system of quantizing an input image signal by quantization steps different from each other, or a second compression system which has compression factor and loss which are than those of the first compression system in accordance with total code quantity of equi-length unit to encode the compression system thus selected, the image compression encoding method comprises: selecting, on encoding system selection basis, either the first compression system or the second compression system; sending a select signal with respect to the selected compression; taking thereinto code quantity by the first compression system or code quantity by the second compression system in accordance with the sent select signal; adding, on encoding system selection basis, code quantities which have been taken thereinto through a switching unit to thereby calculate total code quantities of equi-length unit; and conducting a control so that total code quantity calculated every the quantization step becomes close to target code quantity of equi-length unit.

In the image compression encoding method, control may be conducted so as to linearly interpolate total code quantities calculated every the quantization steps to thereby become close to target code quantity of equi-length unit. In the above-mentioned selection, smaller one of code quantity of the first compression system or the second compression system may be selected. Moreover, in the above-mentioned first compression system, DCT of an input image signal may be performed to quantize the image signal which has been caused to undergo DCT. Further, in the second compression system, encoding may be made by the reversible encoding (Lossless) system. Further, in the second compression system, an input image signal may be encoded by DPCM (Differential Pulse Code Modulation). In addition, control may be performed so that code quantity is not above the target code quantity with respect to the total code quantity.

The program is directed to program for allowing computer to execute a processing to select, on encoding system selection basis, a first compression system of quantizing an input image signal by quantization steps different from each other, or a second compression system having compression factor and loss which are lower than those of the first compression system in accordance with the total code quantity of equi-length unit to encode the compression system thus selected, the program allows the computer to perform processing to select, on encoding system selection basis, either one of the first compression system and the second compression system to send a select signal with respect to the selected compression to take thereinto code quantity by the first compression system or code quantity by the second compression system in accordance with the sent select signal to add code quantities which have been taken thereinto through a switching unit to thereby calculate total code quantity of equi-length unit so that total code quantity calculated every the quantization steps becomes equal to target code quantity of the equi-length unit.

In the image compression encoding apparatus and the image compression encoding method and the program which have been featured above, code quantities from the DCT path or the DPCM path which have been quantized by many quantization steps can be selected, every blocks, efficiently and in a manner to satisfy target code quantity. Thus, efficient code quantity control can be realized without exceeding capacity of recording media like VTR, etc. As a result, distortion in the compression process of image can be reduced.

It is to be noted that while the invention has been described in accordance with preferred embodiments thereof illustrated in the accompanying drawings and described in detail, it should be understood by those ordinarily skilled in the art that the invention is not limited to embodiments, but various modifications, alternative constructions or equivalents can be implemented without departing from the scope and spirit of the present invention as set forth by appended claims.

INDUSTRIAL APPLICABILITY

As explained above in detail, the image compression encoding apparatus and the image compression encoding method according to this embodiment can select, on block basis, code quantity from the first compression system or the second compression system having compression factor and loss which are lower than those of the second compression system which have been quantized by plural quantization steps efficiently and in a manner to satisfy target code quantity. In addition, code quantity from the second compression system is preferentially selected, thereby making it possible to prevent deterioration of image quality. Thus, efficient code quantity control can be realized without exceeding capacity of recording media like VTR, etc. As a result, distortion in the compression process of image can be reduced.

The invention claimed is:

1. An image compression encoding apparatus to compression encode an image signal, comprising:
   selecting means for selecting between a first compression system, which conducts quantization with different quantization steps, and a second compression system having a compression factor and loss which are less than the compression factor and the loss of the first compression system, on the basis of a smaller code quantity of a selection unit of each system and outputting a selection signal;
   switching means for switching between the code quantity of the first compression system and the code quantity of the second compression system to deliver the corresponding code quantity according to the said select signal outputted by the said selecting means; and
   calculation processing means for:
      adding, on an encoding system selection unit basis, the code quantities according to the switching means to accumulate total code quantity of one equi-length unit; and
      specifying a first total code quantity that is the minimum code quantity among total code quantities which exceed the target code quantity for every one of the quantization steps of the first encoding system, based on the said calculated total code quantity and the target total code quantity of one equi-length unit;
      specifying a second total code quantity that is the maximum code quantity among total code quantities less than the target code quantity for every one of the quantization steps of the first encoding system, based on the said calculated total code quantity and the target total code quantity of one equi-length unit;
      comparing, on an encoding system selection unit basis, said code quantity of second compression system with assigned code quantity which is calculated by using said first and second total code quantity through linear interpolation, and outputting select signal that selects encoding system with smaller code quantity; and
   encoding means for encoding image signals using the compression system selected based on the assigned code quantity and the select signal outputted by said calculation processing means from one of:
      a first path which uses first compression system with quantization step determined by said assigned code quantity; and
      a second path which uses second compression system with less loss.

2. The image compression encoding apparatus as set forth in claim 1,
   Wherein the first compression system is a system of performing DCT of the image signal to quantize the image signal which has been caused to undergo DCT, and
   wherein the second compression system is a reversible encoding system.

3. An image compression encoding method for compression encoding an image signal, comprising the steps of:
   selecting between a first compression system, which conducts quantization with different quantization steps, and a second compression system having a compression factor and loss which are less than the compression factor and the loss of the first compression system, on the basis of a smaller code quantity of a selection unit of each system and outputting a selection signal;
   switching between the code quantity of the first compression system and the code quantity of the second compression system to deliver the corresponding code quantity according to the said select signal outputted by the selecting step; and
   adding, on an encoding system selection unit basis, the said code quantities according to the said switching step to thereby accumulate total code quantity of one equi-length unit; and
   specifying a first total code quantity that is the minimum code quantity among total code quantities which exceed the target code quantity for every one of the quantization steps of a first encoding system, based on the said calculated total code quantity and the target total code quantity of one equi-length unit;

specifying a second total code quantity that is the maximum code quantity among total code quantities less than the target code quantity for every one of the quantization steps of the first encoding system, based on the said calculated total code quantity and the target total code quantity of one equi-length unit;

comparing, on an encoding system selection unit basis, said code quantity of second compression system with assigned code quantity which is calculated by using said first and second total code quantity through linear interpolation, and outputting select signal that selects encoding system with smaller code quantity; and encoding image signals using the compression system selected based on the assigned code quantity and the select signal outputted from one of:

a first path which uses first compression system with quantization step determined by said assigned code quantity; and a second path which uses second compression system with less loss.

4. A computer program embodied in a computer-readable medium for controlling a computer to execute an image compression encoding method for compression encoding an image signal comprising the steps of:

selecting between a first compression system, which conducts quantization with different quantization steps, and a second compression system having a compression factor and loss which are less than the compression factor and the loss of the first compression system, on the basis of a smaller code quantity of a selection unit of each system and outputting a selection signal;

switching between the code quantity of the first compression system and the code quantity of the second compression system to deliver the corresponding code quantity according to the said select signal outputted by the selecting step; and adding, on an encoding system selection unit basis, the said code quantities according to the said switching step to thereby accumulate total code quantity of one equi-length unit; and specifying a first total code quantity that is the minimum code quantity among total code quantities which exceed the target code quantity for every one of the quantization steps of a first encoding system, based on the said calculated total code quantity and the target total code quantity of one equi-length unit;

specifying a second total code quantity that is the maximum code quantity among total code quantities less than the target code quantity for every one of the quantization steps of the first encoding system, based on the said calculated total code quantity and the target total code quantity of one equi-length unit;

comparing, on an encoding system selection unit basis, said code quantity of second compression system with assigned code quantity which is calculated by using said first and second total code quantity through linear interpolation, and outputting select signal that selects encoding system with smaller code quantity; and encoding image signals using the compression system selected based on the assigned code quantity and the select signal outputted from one of:

a first path which uses first compression system with quantization step determined by said assigned code quantity; and a second path which uses second compression system with less loss.

* * * * *